Aug. 6, 1935.  W. COOK  2,010,510
MINING DRILL
Filed Nov. 25, 1932  4 Sheets-Sheet 1
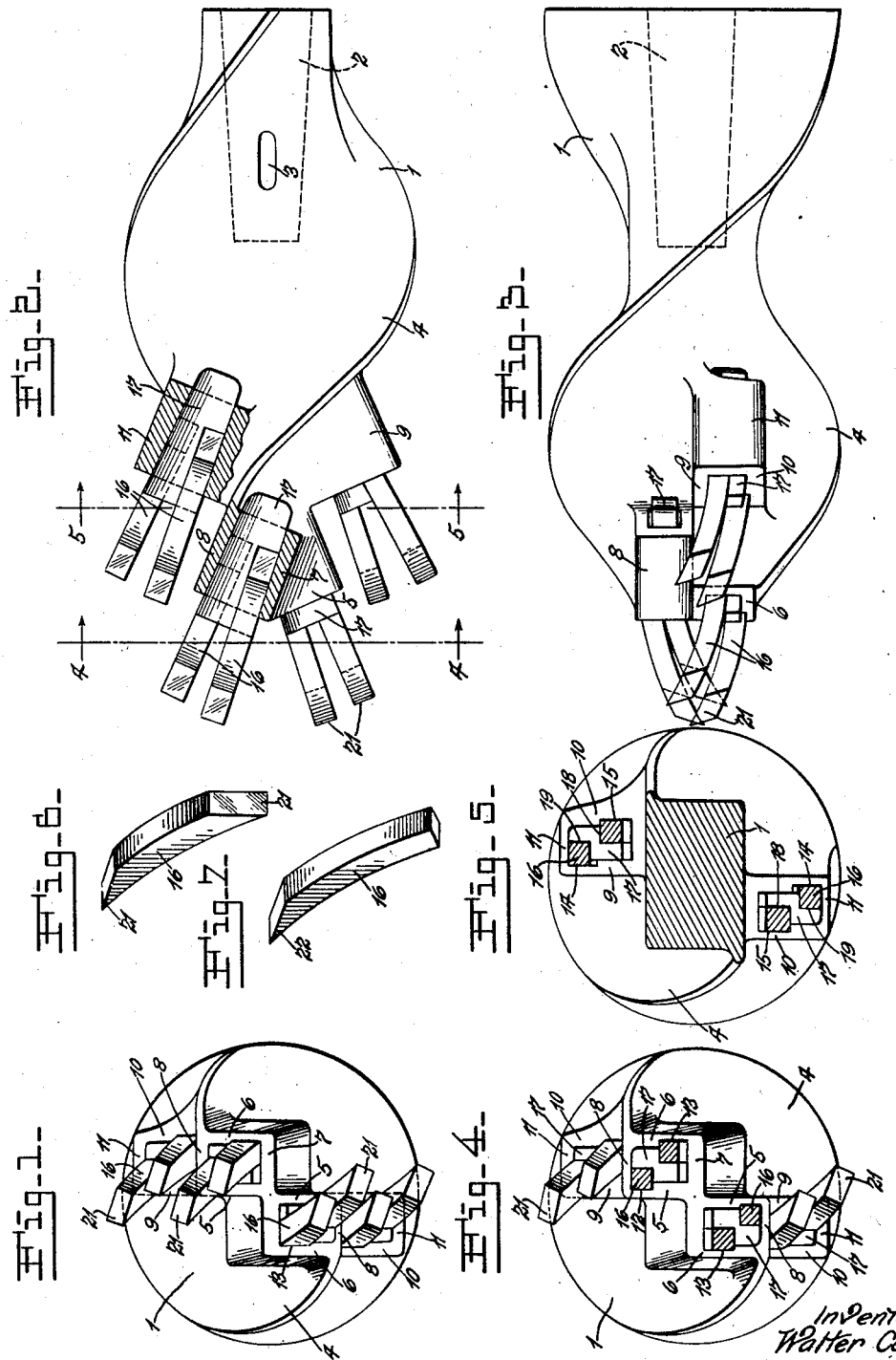

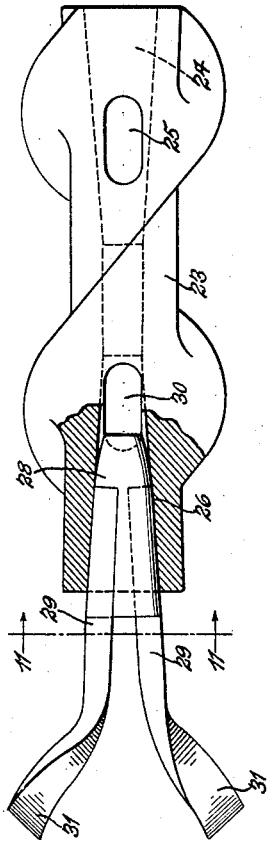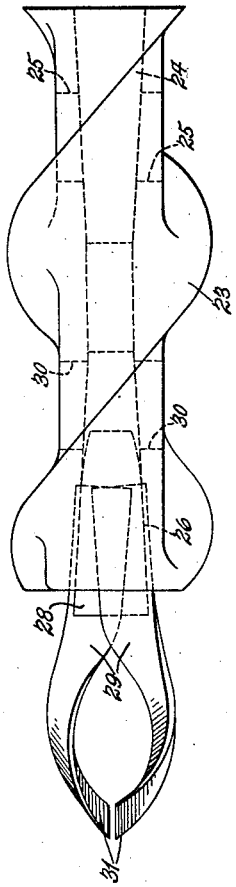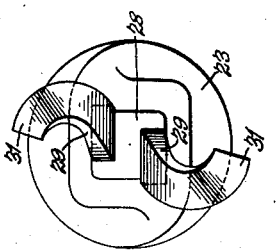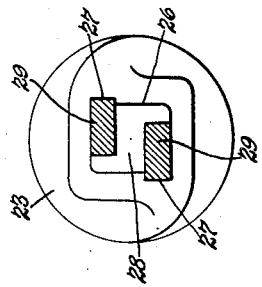

Aug. 6, 1935.  W. COOK  2,010,510
MINING DRILL
Filed Nov. 25, 1932  4 Sheets-Sheet 3
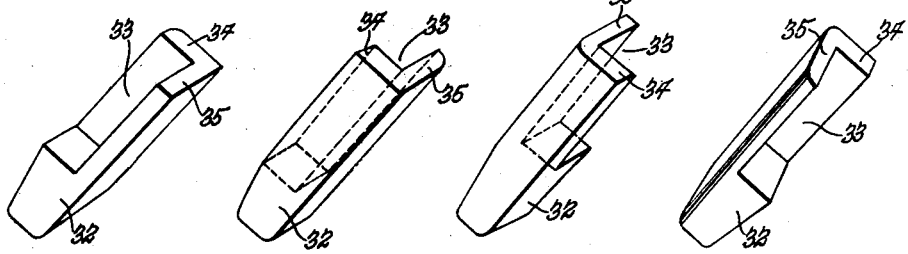
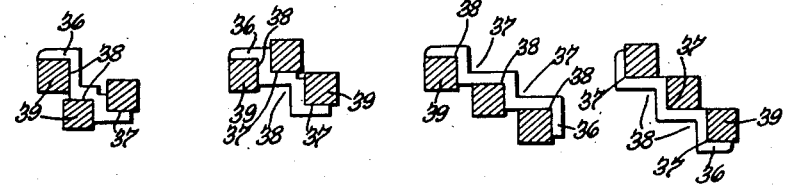
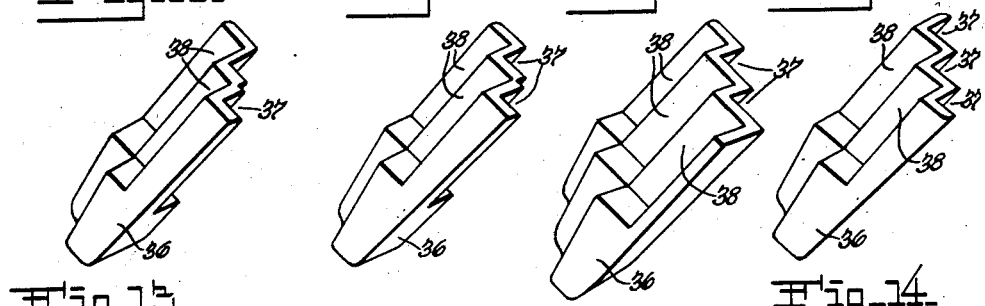
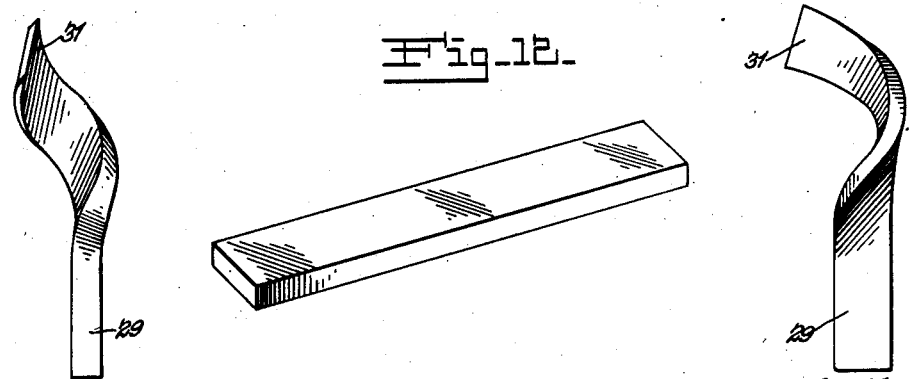
Inventor
Walter Cook
by Rippey & Kingsland
His Attorneys Aug. 6, 1935.  W. COOK  2,010,510
MINING DRILL
Filed Nov. 25, 1932   4 Sheets-Sheet 4
Fig. 27.  Fig. 28.  Fig. 29.
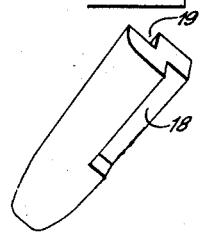 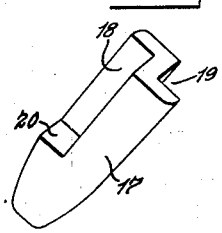 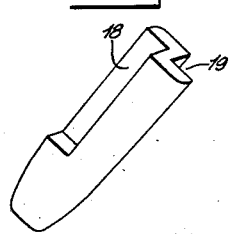
Fig. 30.  Fig. 31.  Fig. 32.
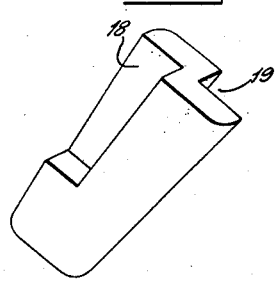 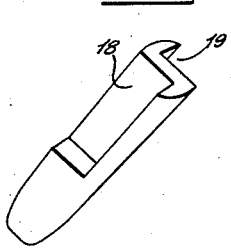 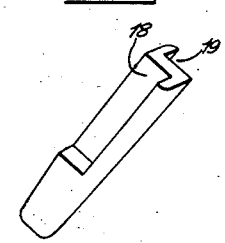
Fig. 33.  Fig. 34.  Fig. 35.
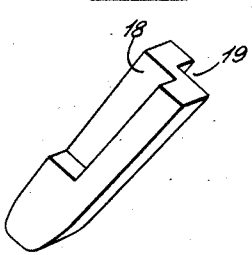 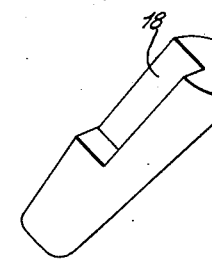 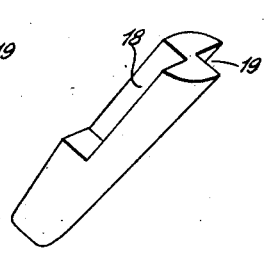
Fig. 36.  Fig. 37.  Fig. 38.  Fig. 39.
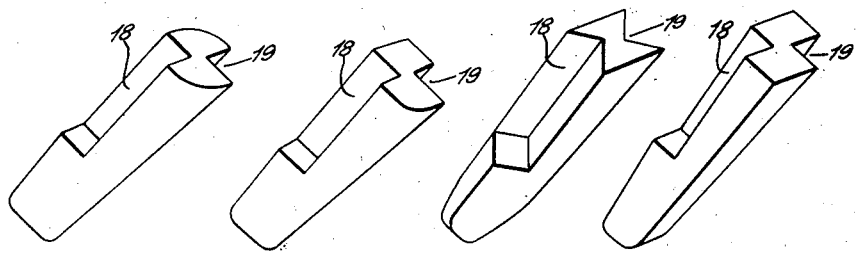
Inventor
Walter Cook
by Rippey & Kingsland
His Attorneys.

Patented Aug. 6, 1935

2,010,510

UNITED STATES PATENT OFFICE 2,010,510

MINING DRILL

Walter Cook, Benton, Ill., assignor to Central Mine Equipment Co., St. Louis, Mo., a corporation of Missouri Application November 25, 1932, Serial No. 644,234

5 Claims. (Cl. 255—69)

This invention relates to mining drills of the auger type.

An object of the invention is to provide an improved auger drill for use in mining, including means for detachably securing to the end of the auger in a novel cooperative relationship series of diverging bits near the axis of the auger and other series of outwardly inclined bits closer to the outer side of the auger.

In one specific arrangement of the invention shown, there are two pairs of bits near the axis of the auger. The bits of each pair extend forwardly from the end of the auger, and incline outwardly from the axis of the auger. The bits of each of these two pairs are relatively offset in an arrangement in which the bits that are closest to the axis of the auger are rearwardly from the associated bits. By this arrangement, each central pair of bits include one bit closest to the axis of the auger located rearwardly from the associated bit, and both bits of each pair of central bits incline outwardly and forwardly. This specific form of the invention also includes two additional pairs of bits located between the central pairs of bits and the outer side of the auger, and the two bits of each of said additional pair of bits inclining forwardly and outwardly in an arrangement similar to the associated pair of bits. The central pairs of bits extend outwardly beyond the associated pairs of bits. All of the bits are arranged in such a relationship to each other that, when the auger is rotated, effective cutting operations are performed and the material that is cut loose by the bits is effectively discharged into the spiral portions of the auger.

Another object of the invention is to provide a mining drill having an auger provided with an axial socket in its forward end, in combination with a wedge removably mounted in said socket and engaging and holding the bits extending forwardly from the end of the auger and curving outwardly, so that the forward ends of the bits are extended laterally beyond a circle projected from the periphery of the auger.

Another object of the invention is to provide various specific forms of wedges designed and adapted for use in connection with the augers herein disclosed.

Various other objects of the invention will appear from the following description, reference being made to the annexed drawings, in which—

Fig. 1 is a front elevation of a mining drill embodying a preferred form of the invention in which two pairs of bits are attached to the front end of the auger at each side of the axis thereof.

Fig. 2 is a front elevation with parts in section to show clearly the wedges mounted in the sockets.

Fig. 3 is a side elevation of the drill turned 90° from the position of the drill shown in Fig. 2.

Fig. 4 is an end elevation of the auger with the two central pairs of bits in section on the line 4—4 of Fig. 2.

Fig. 5 is a cross sectional view approximately on the line 5—5 of Fig. 2.

Fig. 6 is a perspective view of a bit having a cutting edge at each end and which may be used as any one of the bits shown in Fig. 2.

Fig. 7 is a perspective view of a bit having a single cutting end.

Fig. 8 is an end elevation of a drill having a central socket in the front end of the auger receiving a wedge and a pair of bits.

Fig. 9 is a side elevation of this drill with part of the socket walls in section.

Fig. 10 is a side elevation of the drill turned 90° from the position shown in Fig. 9.

Fig. 11 is a cross sectional view of the bits on the line 11—11 of Fig. 9.

Fig. 12 is a perspective view of a straight bar from which the bits may be formed.

Fig. 13 is a side elevation of one of the bits made from the bar shown in Fig. 12.

Fig. 14 is a side elevation of the bit turned 90° from the position shown in Fig. 13.

Figs. 15 to 22, inclusive, are perspective views showing different forms of wedges.

Figs. 23 to 26, inclusive are end elevations of the wedges shown in Figs. 19 to 22, inclusive, the bits being shown in section.

Figs. 27 to 39 are perspective views of different forms of wedges capable of use with either type of auger shown.

The detachable end member 1 of the auger is formed with a socket 2 adapted and designed to receive an extended portion of the main part of the auger, and has a keyhole 3 arranged to receive a key to secure the part 1 rigidly on said extended portion of the main part of the auger.

The forward end of the member 1 is provided with two pairs of sockets, comprising a pair of central sockets and a pair of outer sockets between the central sockets and the periphery of the member 1, and formed in integral connection with the inclined walls of the ribs 4 of the member 1.

Each of the central sockets includes a wall 5 that is at the front when the auger rotates, a wall 6 that is at the rear during rotation of the auger, and converging walls 7 and 8. The sockets thus formed are open at their rear ends.

Each socket of the remaining pair of sockets comprises a wall 9 that is at the front as the auger rotates, a wall 10 that is at the rear as the auger rotates, and a wall 11 converging with respect to the opposite wall 11'. These walls 9, 10, 11 and 11' form sockets that are open at the rear.

The walls 5 have notches 12 therein adjacent to the walls 8, and the walls 6 have therein notches 13 adjacent to the walls 7. The walls 9 have therein notches 14 adjacent to the walls 11, and the walls 10 have therein notches 15 adjacent to the walls 11'.

The pair of central sockets project forwardly beyond the pair of lateral sockets, the front ends of the lateral sockets being well rearwardly of the front ends of the central sockets.

It will be understood by any one familiar with the operation of spiral drills that, as illustrated in Figs. 1, 4 and 5, the drill is rotated in a counter-clockwise direction. The member 1 includes the spiral ribs 4 and the sockets in which the bits and wedges are mounted. The two central sockets are in integral connection with the rear sides of the spiral ribs 4, and the two outer sockets are in integral connection with the forward sides of said ribs. The terminal portion of the member 1 including these sockets at no point exceeds the diameter of the drill as defined by the peripheries of the spiral ribs 4. Accordingly, the blunt forward ends of the several sockets, which do not exceed the diameter of the drill as defined by the spiral ribs 4, are not required to perform any cutting or breaking effect in the earth or mineral into which the drill is operated as said blunt forward ends would be required to do if the diameter of the terminal portion of the member 1 having thereon the several sockets exceeded the diameter of the drill as defined by the spiral ribs 4. Further, as presently explained and as clearly shown in the drawings, the forward cutting ends of the outer bits are spaced apart a distance greater than the diameter of the drill so that said bits will cut a hole of larger diameter than the spiral portion of the drill. These advantages are obtained, in part at least, by the novel and effective arrangement of the sockets on opposite sides of the spiral ribs.

A wedge bit holder is mounted in each socket and cooperates with the walls of the socket in which it is mounted to clamp and wedge the bodies of a pair of bits 16 in the socket in which the wedge is mounted. Each wedge comprises a tapered body 17 having notches 18 and 19 in its diagonally opposite corners opposite the notches 12 and 13 of the central sockets and the notches 14 and 15 of the lateral sockets, respectively. These notches 18 and 19 do not extend the full length of the wedge body 17 but terminate at shoulders 20 (Fig. 28), which form abutments for the inner ends of the bits 16. These notches 18 and 19 converge rearwardly from the front end of the body 17, so that the bits 16 are held in a relationship in which the bits of each pair of bits diverge toward the front ends of said bits, as clearly shown in Fig. 2 of the drawings. The rear ends of the bodies 17 project beyond the rear ends of the sockets in which they are mounted, so that said rear ends constitute impact heads which may be struck by a hammer, or the like, to drive the wedges from the sockets.

The construction thus provided includes a pair of diverging central sockets at the front of the member 4. The wedge members, mounted in the central sockets, diverge forwardly. The bits 16, mounted in each central socket, diverge forwardly from the bits in the adjacent central socket, and the bits of each pair of bits in the central sockets also diverge from each other.

The bits 16, mounted in each socket, also diverge from each other, the rear ends of the lateral bits being well rearwardly of the rear ends of the central bits, and the two outer bits in the lateral sockets having their ends extended laterally and spaced apart a greater distance than the diameter of the member 1 (Figs. 1 and 4).

These bits 16 may be of the form shown in Fig. 6 and provided with a cutting end 21 at each end of the bit body or with a cutting point 22 at only one end of the bit body, as shown in Fig. 7. The bits 16 curve or bend forwardly to a limited extent in the direction of rotation of the body 1. Both of the cutting ends 21 are on the same or at the forward side, which is at the inner wall of the curved body 16. These cutting ends are formed by beveled walls diverging from the rear or outer wall of the curved body 16 to intersection with the forward or inner wall of said body. These beveled walls forming these duplicate cutting ends on the bit practically double the length of time during which the bit may be effectively used without sharpening, because when one cutting end becomes dulled, the bit may be reversed and the opposite or sharp cutting end placed in use. Then when both cutting ends 21 become dulled, the bit may be removed and both ends again sharpened. Also the cutting end 22 is formed by a wall extending obliquely from the rear outer curve of the body of the bit to intersection with the inner curved wall of the body of the bit. The direction of inclination of the wall forming the cutting end 22 is the same as the direction of inclination of either of the walls forming the cutting ends 21.

The complete assembly of the mine drill of this construction comprises a body 1 having two central sockets at its forward end that diverge and two lateral sockets at its forward end rearwardly from the central socket and diverging. In this assembly, the bits 16 of each pair of bits diverge from each other, and the pairs of bits 16 at the center of the central pairs of bits diverge. The wedges 17 extend through the open ends or are accessible at the open ends of the sockets, so that these wedges may be easily hit by a hammer, or equivalent tool, and driven forwardly out of the sockets. The bits of each pair of bits are arranged in staggered relationship, the outer bit of each pair of bits being in advance of the other bit. The material cut loose by these revolving bits works along the spiral ribs 4 of the body 1 and thence to similar spiral ribs of the auger.

In the arrangement shown in Figs. 3 to 11, inclusive, the detachable member 23 is formed with a socket 24 adapted and designed to receive an extended portion of the main part of the auger, and has a keyhole 25 to receive a key to secure the member 23 rigidly on said extended portion of the main part of the auger.

The front end of the member 23 is formed with a tapered axial socket 26, in diagonally opposite corners of which grooves 27 are formed. A tapered Z-shaped wedge 28 is driven into the tapered socket 26. The untwisted bit ends 29 are seated in the notches in the approximately Z-shape wedge 28 and in the grooves 27, and are rigidly wedged in connection with the forward end of the member 23. The wedge 28 tapers and its rear end is accessible through a hole 30 in the member 23, so that said wedge may be driven out and detached from the member 23. The front ends 31 of the bits are twisted spirally and are extended outwardly in diverging spiral directions, the distance between the outer edges of said front ends 31 being greater than the diameter of the spiral member 23 and also greater than the diameter of the main part of the auger. Accordingly, these bits will drill a hole somewhat larger than the diameter of the auger, and the spiral formation of the bits will force the loose material toward the spiral member 23 and thence to the similar spiral auger.

The remaining views of the drawings show various formations of the wedges, all of which have notches or grooves designed and adapted to receive correspondingly shaped portions of bits. Some of these wedges have single grooves for receiving and wedging a single bit; others have two grooves for receiving and wedging a pair of bits; and others are shaped and formed to receive more than two bits in different relative relationships. These wedges are driven into the sockets of the general form indicated, and will cooperate with the walls of the sockets to wedge the bits in rigid connection with the auger.

The wedges, shown in connection with the auger member 1 and one of which is shown detached in Fig. 28, are approximately Z-shaped, the notches 18 and 19 being formed in diagonally opposite corners and thereby forming the wedge of general Z-shape. These notches, to which the reference numerals 18 and 19 are also applied in Figs. 27 and 29 to 39, inclusive, may be of different depths and located in different relative positions. Moreover, the wedge bodies may be of different shapes, as illustrated in Figs. 34 to 39, inclusive, in which the corners of the notches extend generally toward each other, being offset laterally from each other to some extent, as indicated in Figs. 37 and 38 for instance. These wedges are driven into the sockets in the end of the auger member 1 or into the end of the auger member 23 and will cooperate with the walls of the sockets to clamp the wedges and the bits in rigid connection with the auger member. By providing wedges having the notches 18 and 19 arranged in different relationships, it is apparent that the bits may be mounted in different relationships in accordance with the formation of the notches.

In any instance in which it may be desired to use a single bit in any socket, tapered wedges of the type shown in Figs. 15 to 18, inclusive, may be employed. Each of these wedges consists of a body 32 of a size such that it will wedge in any of the sockets. Each body 32 is provided with a single notch 33, thereby forming angularly disposed wedge walls 34 and 35 against and by which the bit will be clamped against the walls of the socket in which the bit and wedge member are mounted. The walls 35 are wider than the walls 34, although these walls may be made of any width desired and suitable for the purpose for which the wedges are intended.

Figs. 19 to 26, inclusive, illustrate wedge members, each of which comprises a body 36 having in one side a number of notches 37 and in the opposite side a number of notches 38, each designed to receive a bit 39. These bits may be mounted in the relationship indicated in either of Figs. 23 to 26, inclusive, being mounted on opposite sides of the wedge, as shown in Figs. 23 and 24, or all on either side of the wedge, as shown in Figs. 25 and 26. It is probably unnecessary to mount bits in every notch of each wedge but, should this be found desirable, it is clearly apparent that the bits may be mounted in every notch of each wedge.

It is now clear enough that these various forms of wedges are merely variants of wedges of general Z-shape shown in Figs. 27 to 33, inclusive, one of the ends of the Z being omitted in the wedges shown in Figs. 15 to 18, inclusive, leaving the walls 34 and 35 in the angular relationship shown. And, in Figs. 19 to 26, inclusive, the wedges of the general Z-shape are extended to include another angular notch, so that each wedge can accommodate and wedge more than two bits in practically any relationship in which it may be desired or advantageous to arrange the bits.

The variation as to form indicated in Figs. 34 to 39, inclusive, while retaining the Z-shape may be more precisely defined as of general X-shape, the slight variation being obtained by the changed relationship of the notches.

In some instances, as clearly shown in Figs. 2, 9 and 10, the wedges extend beyond both ends of the sockets in which they are mounted. As before indicated, the rear ends of these wedges may be struck by a hammer to drive the wedges from the sockets. The front ends of the wedges extending beyond the sockets have their outer portions at the rear of the bits 16 in the outer notches of the wedges and thus strengthen and brace the outer bits beyond the ends of the sockets without in the least interfering with the cutting action of the bits. By this construction, it is possible to make a satisfactory drill with the walls of the sockets of less thickness and containing less material than would be possible if dependence were placed wholly upon the walls of the sockets to support and brace the bits. As shown in Figs. 8 to 11, inclusive, each bit is in front of the body portion of the wedge which extends beyond the end of the socket and thus strengthens and braces the bits.

The device may be varied in other particulars and still remain within the scope of the invention. I do not restrict myself in unessential matters, but what I claim is:

1. In a mining drill, walls forming a pair of forwardly diverging sockets in its forward end and other walls forming a pair of forwardly diverging lateral sockets rearwardly of and laterally from said first sockets, a wedge member removably mounted in each of said sockets and having diagonally opposite notches in its corners, and bits mounted rigidly in said notches in said wedge members and clamped against the walls of said sockets.

2. In a mining drill having a tapered socket in its forward end, a wedge removably mounted in and extending forwardly beyond said socket and having notches in diagonally opposite portions thereof, and cutting bits extending into said socket and in said notches and thereby rigidly secured in connection with said drill in a relationship in which one of said bits is in front of said wedge and said bits diverge forwardly and have their forward ends spaced apart a distance in excess of the diameter of said drill.

3. As an article of manufacture, a bit wedge to be driven in and from a socket in a bit head comprising a tapered body that is polygonal in cross section and is longer than certain of the walls of the socket for which the wedge is intended, and said body having diagonally opposite notches at the corners thereof terminating short of the rear end of said body, and an impact head at the rear of said body rearwardly beyond the rear ends of said notches.

4. In a mining drill, walls forming a pair of forwardly diverging sockets in its forward end, a wedge member removably wedged in each of said sockets and each having an impact end extending rearwardly beyond certain of said walls for impact in driving said wedges from said sockets, said wedges having diagonally opposite notches in their corners extending from the forward ends of said wedges and terminating short of the rear ends of said socket walls beyond which impact ends extend, and bits mounted rigidly in said notches in said wedge members and clamped against the walls of said sockets.

5. As an article of manufacture, a removable bit wedge adapted to be driven into and from a socket open at both ends, comprising a tapered body having diagonally opposite bit receiving notches in opposite corners thereof extending from the front end toward the rear end of said body, and an impact head integral with the rear end of said body beyond and closing the rear ends of said notches.

WALTER COOK.